(12) United States Patent
Coates

(10) Patent No.: US 7,810,993 B2
(45) Date of Patent: Oct. 12, 2010

(54) TEMPERATURE SENSOR HAVING A ROTATIONAL RESPONSE TO THE ENVIRONMENT

(75) Inventor: Don M Coates, Santa Fe, NM (US)

(73) Assignee: Chevron U.S.A. Inc., San Ramon, CA (US)

( * ) Notice: Subject to any disclaimer, the term of this patent is extended or adjusted under 35 U.S.C. 154(b) by 372 days.

(21) Appl. No.: 12/026,757

(22) Filed: Feb. 6, 2008

(65) Prior Publication Data

US 2008/0187025 A1 Aug. 7, 2008

Related U.S. Application Data

(60) Provisional application No. 60/899,627, filed on Feb. 6, 2007.

(51) Int. Cl.
*G01K 7/00* (2006.01)
*G01K 13/00* (2006.01)
*G01K 1/00* (2006.01)

(52) U.S. Cl. .................. 374/184; 374/136; 374/141

(58) Field of Classification Search .............. 374/184, 374/136, 141
See application file for complete search history.

(56) References Cited

U.S. PATENT DOCUMENTS

| | | | |
|---|---|---|---|
| 3,320,579 A | 5/1967 | Abbott | |
| 3,562,741 A | 2/1971 | McEvoy et al. | |
| 4,023,136 A | 5/1977 | Lamensdorf et al. | 340/18 NC |
| 4,160,970 A | 7/1979 | Nicolson | 340/18 LD |
| 4,218,507 A | 8/1980 | Deffeyes et al. | 428/328 |
| 4,308,499 A | 12/1981 | Thierbach et al. | 324/337 |
| 4,430,577 A | 2/1984 | Bouquet | 307/108 |
| 4,839,644 A | 6/1989 | Safinya et al. | 340/854 |
| 4,845,378 A | 7/1989 | Garbe et al. | 307/106 |
| 4,883,366 A * | 11/1989 | Dohi et al. | 374/184 |
| 4,950,084 A * | 8/1990 | Bailleul et al. | 374/144 |
| 5,150,067 A | 9/1992 | McMillan | 328/64 |

(Continued)

FOREIGN PATENT DOCUMENTS

DE 10245425 A1 4/2003

(Continued)

OTHER PUBLICATIONS

International Search Report and Written Opinion for PCT International Patent Application No. PCT/US2008/075214, mailed on Oct. 10, 2009.

(Continued)

*Primary Examiner*—Lisa M Caputo
*Assistant Examiner*—Mirellys Jagan
(74) *Attorney, Agent, or Firm*—Pillsbury Winthrop Shaw Pittman LLP

(57) ABSTRACT

Methods and systems of the invention are directed to a temperature sensor that includes a substrate, a first conductive plate, and a second conductive plate. The substrate is formed of a material having a low coefficient of thermal expansion (CTE). The first conductive plate is formed of a material having a CTE that is higher than the CTE of the substrate, and is attached to a first surface of the substrate. The second conductive plate is rotatably connected to the substrate through a hinge, and includes a portion that is adjacent to the first conductive plate.

16 Claims, 4 Drawing Sheets

U.S. PATENT DOCUMENTS

| | | | |
|---|---|---|---|
| 5,355,714 A | 10/1994 | Suzuki et al. ............... 73/146.5 |
| 5,359,491 A * | 10/1994 | Coville et al. .............. 361/280 |
| 5,423,222 A | 6/1995 | Rudd et al. .................... 73/779 |
| 5,451,873 A | 9/1995 | Freedman et al. ........... 324/303 |
| 5,467,083 A | 11/1995 | McDonald et al. ....... 340/854.6 |
| 5,576,703 A | 11/1996 | MacLeod et al. ......... 340/854.4 |
| 5,587,707 A | 12/1996 | Dickie et al. ........... 340/870.09 |
| 5,680,029 A | 10/1997 | Smits et al. ..................... 320/2 |
| 5,686,779 A | 11/1997 | Vig ............................. 310/366 |
| 5,751,895 A | 5/1998 | Bridges |
| H1744 H | 8/1998 | Clayton et al. ............... 374/117 |
| 5,821,129 A | 10/1998 | Grimes et al. ............... 436/151 |
| 5,917,160 A | 6/1999 | Bailey |
| 5,936,913 A | 8/1999 | Gill et al. ....................... 367/25 |
| 5,942,991 A | 8/1999 | Gaudreau et al. ...... 340/870.16 |
| 6,025,725 A | 2/2000 | Gershenfeld et al. ........ 324/652 |
| 6,234,257 B1 | 5/2001 | Ciglenec et al. ............... 175/50 |
| 6,393,921 B1 | 5/2002 | Grimes et al. ................. 73/728 |
| 6,434,372 B1 | 8/2002 | Neagley et al. ............. 455/106 |
| 6,489,772 B1 | 12/2002 | Holladay et al. |
| 6,633,236 B2 | 10/2003 | Vinegar et al. ........... 340/854.4 |
| 6,670,880 B1 | 12/2003 | Hall et al. .................... 336/132 |
| 6,766,141 B1 | 7/2004 | Briles et al. .................... 455/40 |
| 6,993,432 B2 | 1/2006 | Jenkins et al. ................. 702/13 |
| 7,017,662 B2 | 3/2006 | Schultz et al. ............. 166/254.2 |
| 7,114,561 B2 | 10/2006 | Vinegar et al. ......... 166/250.01 |
| 7,158,049 B2 | 1/2007 | Hoefel et al. ............. 340/855.7 |
| 7,168,487 B2 | 1/2007 | Salamitou et al. ...... 166/250.11 |
| 7,180,826 B2 | 2/2007 | Kusko et al. ................... 367/85 |
| 7,256,707 B2 | 8/2007 | Clark et al. .............. 340/854.4 |
| 7,397,388 B2 | 7/2008 | Huang et al. .............. 340/853.3 |
| 7,548,068 B2 | 6/2009 | Rawle et al. ................. 324/534 |
| 2002/0195247 A1 | 12/2002 | Ciglenec et al. |
| 2003/0010492 A1 | 1/2003 | Hill et al. |
| 2005/0110655 A1 | 5/2005 | Layton |
| 2006/0266109 A1 | 11/2006 | DiFoggio |
| 2007/0030762 A1 | 2/2007 | Huang et al. ................... 367/83 |
| 2007/0107528 A1 | 5/2007 | Schroeder et al. ............. 73/779 |
| 2007/0206440 A1 | 9/2007 | Fripp et al. ..................... 367/81 |
| 2007/0235184 A1 | 10/2007 | Thompson et al. ..... 166/250.01 |
| 2008/0061789 A1 | 3/2008 | Coates et al. ................ 324/333 |
| 2008/0184787 A1 | 8/2008 | Coates et al. ............. 73/152.12 |
| 2008/0185328 A1 | 8/2008 | Stefanini .................... 210/222 |
| 2008/0187025 A1 | 8/2008 | Coates et al. ................ 374/184 |
| 2008/0253230 A1 | 10/2008 | Thompson et al. .......... 367/129 |
| 2008/0259992 A1 * | 10/2008 | Sumida et al. .............. 374/106 |
| 2008/0264624 A1 | 10/2008 | Hall et al. ................... 166/66.5 |
| 2009/0159361 A1 | 6/2009 | Coates et al. ................ 181/106 |
| 2009/0174409 A1 | 7/2009 | Coates et al. ................ 324/338 |

FOREIGN PATENT DOCUMENTS

| | | |
|---|---|---|
| EP | 0314654 | 5/1989 |
| EP | 1434063 A | 6/2004 |
| GB | 2386691 | 9/2003 |
| GB | 2425593 | 11/2006 |

OTHER PUBLICATIONS

Goswami et al., On Subsurface Wireless Data Acquisition System, IEEE Transactions on Geoscience and Remote Sensing, vol. 43, No. 10, Oct. 2005.

* cited by examiner

TEMPERATURE SENSOR HAVING A ROTATIONAL RESPONSE TO THE ENVIRONMENT

CROSS REFERENCE TO RELATED APPLICATIONS

This application claims the benefit of priority to U.S. provisional application Ser. No. 60/899,627, filed Feb. 6, 2007, the entire contents of which is incorporated herein in its entirety by reference.

FIELD

The present invention relates generally to temperature transducers and more particularly to transducers that shift a frequency of a reflected signal based on a response to temperature.

BACKGROUND

In operations, piping can extend hundreds or thousands of feet below ground to a well through a harsh environment. Devices have been used for monitoring downhole conditions of a drilled well so that efficient operation can be maintained. These downhole conditions include temperature and pressure, among others. A temperature sensor implemented in this environment should be robust and configured to operate within the potentially difficult environmental conditions. Likewise, a temperature sensor in this environment should be relatively insensitive to changes in pressure.

SUMMARY

A temperature sensor in accordance with an embodiment includes a substrate formed of a material having a first coefficient of thermal expansion, wherein the substrate has a first mount portion. The temperature sensor also includes a first conductive plate formed of a material having a second coefficient of thermal expansion that is higher than the first coefficient of thermal expansion. The first conductive plate is attached to a first surface of the substrate and the first conductive plate has a first contact portion. A second conductive plate of the temperature sensor has a second mount portion rotatably connected to the first mount portion of the substrate, the second conductive plate being adjacent to the first conductive plate.

A temperature sensor in accordance with an embodiment includes a first conductive element configured and arranged to generate a mechanical force in response to a temperature condition. The temperature sensor also includes a second conductive element configured and arranged to vary a capacitance in response to the mechanical force, the second conductive element having a first portion and a second portion such that the second conductive element establishes a distance between the first portion and the first conductive element via a rotation of the second portion about an axis of the first conductive element. The first portion of the second conductive element is adjacent to a surface of the first conductive element, and the second portion of the second conductive element is rotatably attached to a mounting portion of the first conductive element.

A method in accordance with an embodiment include measuring temperature in an enclosure using a system having a capacitive sensor with a first conductive plate having a high coefficient of thermal expansion and a second conductive plate rotatably attached to the first conductive plate. The method includes generating a signal having a predetermined frequency, shifting the frequency of the generated signal based on a rotation of the first conductive plate or second conductive plate due to the temperature of the enclosure, and correlating the frequency shift to a temperature value.

A system in accordance with an embodiment includes a receiver in an enclosure, a sensor, configured and arranged to modulate the electromagnetic signal based on a temperature in the enclosure, and a processor configured and arranged to correlate the modulated signal to a temperature value. The sensor includes first conductive elements configured and arranged to generate a mechanical force in response to a temperature condition. The sensor also includes a second conductive element rotatable about the first conductive element in response to the mechanical force, the second conductive element having a first portion and a second portion such that the second conductive element establishes a distance between the first portion and the first conductive element via a rotation of the second portion about an axis of the first conductive element. The first portion of the second conductive element is adjacent to a surface of the first conductive element, and the second portion of the second conductive element is rotatably attached to a mounting portion of the first conductive element.

DESCRIPTION OF THE DRAWINGS

Embodiments will be described in greater detail in reference to the drawings, wherein.

DETAILED DESCRIPTION

Figure 1:
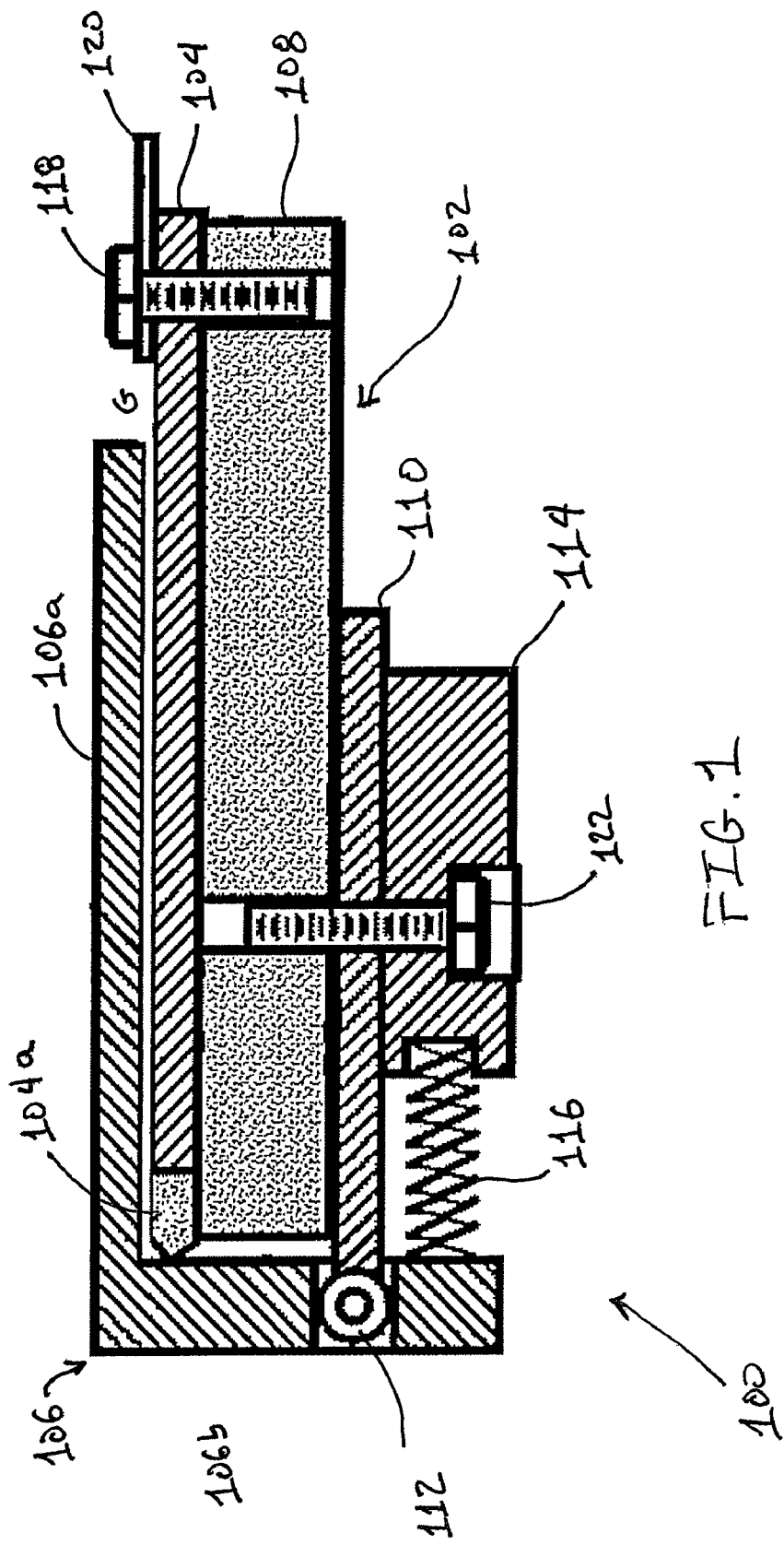
FIG. 1 illustrates a first temperature sensor in accordance with an embodiment.

FIG. 1 is a schematic illustration of an embodiment directed to a temperature sensor 100. The temperature sensor 100 includes a substrate 102, a first conductor plate 104, and a second conductor plate 106.

The substrate 102 includes a first substrate layer 108 and a second substrate layer 110. The first substrate layer 108 is formed from an insulating material, such as Maycor™ ceramic, for example, having a low coefficient of thermal expansion. The first substrate layer 108 contacts a bottom surface of the first conductor plate 104. The second substrate layer 110 contacts a bottom surface of the first substrate layer 108, and is connected to the second conductor plate 106 through a hinge 112. The second substrate layer 110 is formed from a material having a coefficient of thermal expansion that is lower than the coefficient of thermal expansion of the first substrate layer 108. In embodiments, the second substrate layer 110 may be formed from a material such as Invar®, for example. One of ordinary skill in the art will appreciate that the materials that make up the first substrate layer 108 and the second substrate layer 110 are not limited to Maycor™ and Invar®, respectively, and may be formed of any material that achieves the desired response.

The first conductor plate 104 is arranged on a top surface of the first substrate layer 108, and is formed of a metal having a coefficient of thermal expansion that is greater than the coefficient of thermal expansion of the first substrate layer 108. Aluminum is a suitable metal for use as the first conductor plate 104, however one of ordinary skill in the art will appreciate that the first conductor plate 104 is not limited to this selection. Conductors having a linear coefficient of thermal expansion greater than about $10 \cdot 10^{-6}$ 1/K, and in particular, metals having such a coefficient, are well-suited to use in this embodiment. Examples include many types of steel, copper and aluminum, though the invention is not limited to these examples. The first conductor plate 104 includes a non-conductive portion 104a. The non-conductive portion 104a is a portion of the first conductor plate 104 that is anodized or otherwise processed to be non-conductive. The non-conductive portion 104a includes a tip portion that contacts the second conductor plate 106 such that a fulcrum is established.

The second conductor plate 106 includes a first leg 106a and a second leg 106b. The first leg 106a extends in a plane that is substantially parallel to the first conductor plate 104. The first leg 106a and the first conductive means plate 104 are arranged such that a gap (G) of approximately ten one thousandths of an inch (0.010"), or lesser or greater, is established therebetween. The second leg 106b is integrated with the first leg 106a and extends in a plane that is substantially perpendicular to the direction of the first leg 106a. In an embodiment, the first leg 106a and the second leg 106b can be configured in an L-shape, for example, but may also be configured in any manner that achieves the desired response. The second leg 106b includes a hinge 112 to which the second substrate layer 110 is connected, and contacts the non-conductive portion 104a of the first conductive means plate 104.

The hinge 112 that is securely mounted to the second leg 106b and includes a metal sleeve and a pin.

The temperature sensor 100 may also include a mounting block 114 that is attached to a bottom surface of the substrate 102. The mounting block 114 may include recessed portions for mounting the temperature sensor 100 to a rigid structure.

The mounting spring 116 connects an end of the mounting block 114 to the second leg 106b of the second conductor plate 106. The mounting spring 116 provides a restorative force that enables the gap (G) of the temperature sensor 100 to return to its original spacing at ambient temperatures. A positive stop, not shown, may be employed to avoid the spring enlarging the gap beyond a selected starting distance.

The temperature sensor 100 includes fasteners 118 and 122 that secure the substrate 102, the first conductor plate 104, and the mounting block 114 to one another. The fastener 118 extends from a top surface of the first conductor plate 104 to an interior portion of the substrate 102. The second fastener 122 extends from a bottom surface of the mounting block 114 to an interior portion of the substrate 102. The fasteners 118 and 122 can be implemented through a number of known fastening devices, such as a screw, tangs, pins, or rivets, for example. The fastener 118 may be adjusted along the length of the first conductive means plate 104 to a point where the fastener 118 does not effect the spacing of the gap (G).

A terminal 120 is arranged on the first conductor plate 104. The terminal 120 is secured to the first conductor plate 104 through the fastener 110. The terminal 120 extends from an outer end of the first conductor plate 104. The terminal 120 is formed of conductive materials, such as a welded wire for example, and provides a connection to an external circuit.

During operation, as the temperature of the surrounding environment increases, the first conductor plate 104 expands in a lengthwise direction. This expansion of the first conductor plate 104 causes a force to be applied to the first leg 106a of the second conductor plate 106 at the fulcrum of the non-conductive portion 104a. The force created by the expansion of the first conductor plate 104 and the second conductor plate causes one of the conductor plates to rotate about the hinge 112 and adjust the spacing of the gap (G). The gap (G) may be adjusted in a range of approximately 0.010" to 0.030", or lesser or greater as desired. Whether the first conductor plate 104 or the second conductor plate 106 rotates about the hinge 112 is determined by which of the aforementioned components is mounted to a rigid structure.

For example, in an embodiment, the second conductor plate 106 may be attached or mounted to a rigid structure (not shown) through the second leg 106b. As the external temperature increases, the degree of expansion undergone by the first conductor plate 104 determines an amount of force that the first conductor plate 104 applies to the second leg 106b of the second conductor plate 106 at the fulcrum of the non-conductive portion 104a. Because the second conductor plate 106 is securely mounted to a rigid structure, the amount of force applied by the first conductor plate 104 determines the angle at which the first conductor plate 104 (through its attachment to the substrate 102) rotates about the hinge 112.

In some embodiments, the mounting plate 114 is securely attached or mounted to a rigid structure. As the external temperature increases, the degree of lengthwise expansion of the first conductor plate 104 determines the amount of force that the first conductor plate 104 applies to the second leg 106b of the second conductor plate 106 at the fulcrum of the non-conductive portion 104a. Because the first conductor plate 104 is effectively mounted to the rigid structure through the mounting plate 114, the amount of force applied by the first conductor plate 104 determines the angle at which the second conductor plate 106 rotates about the hinge 112.

The angle of rotation about the hinge 112 of either the second conductor plate 106 or the substrate 102 is determined by the degree of lengthwise expansion realized by the first conductor plate 104 and the amount of bend (warping or bowing) realized by the first leg 106a of the second conductor plate 106, respectively. In response to an increase of the external temperature, the first conductor plate expands to thereby apply a force to the second conductor plate 106 through the fulcrum of the non-conductive portion 104a. The amount of applied force determines the angle of rotation about the hinge 112 that is achieved by either of the first conductor leg 104 or the second conductor leg 106.

As the temperature nears ambient levels, the lengthwise expansion of the first conductor plate 104 also decreases. As the expansion decreases, the first conductor plate 104 returns to its initial state. The mounting spring 116 restores the temperature sensor 100 to its original position by applying a force to rotate either the first conductor plate 104 or the second conductor plate 106, depending on the mounting position, in an opposite direction about the hinge 112.

In some embodiments, the temperature sensor 100 is composed of metal and ceramic materials that enable temperature measurements within a range of approximately 40° F. to 600° F., or lesser or greater as desired. The range of temperature measurements is determined by the resiliency of the materials along with the degree of expansion and the degree of warpage undergone by the conductor plates, respectively. The degree expansion of the conductor plate 104 is determined by the thickness and rigidity of the substrate 102. For example, the substrate 102 may be a single or multilayered structure.

Figure 2:
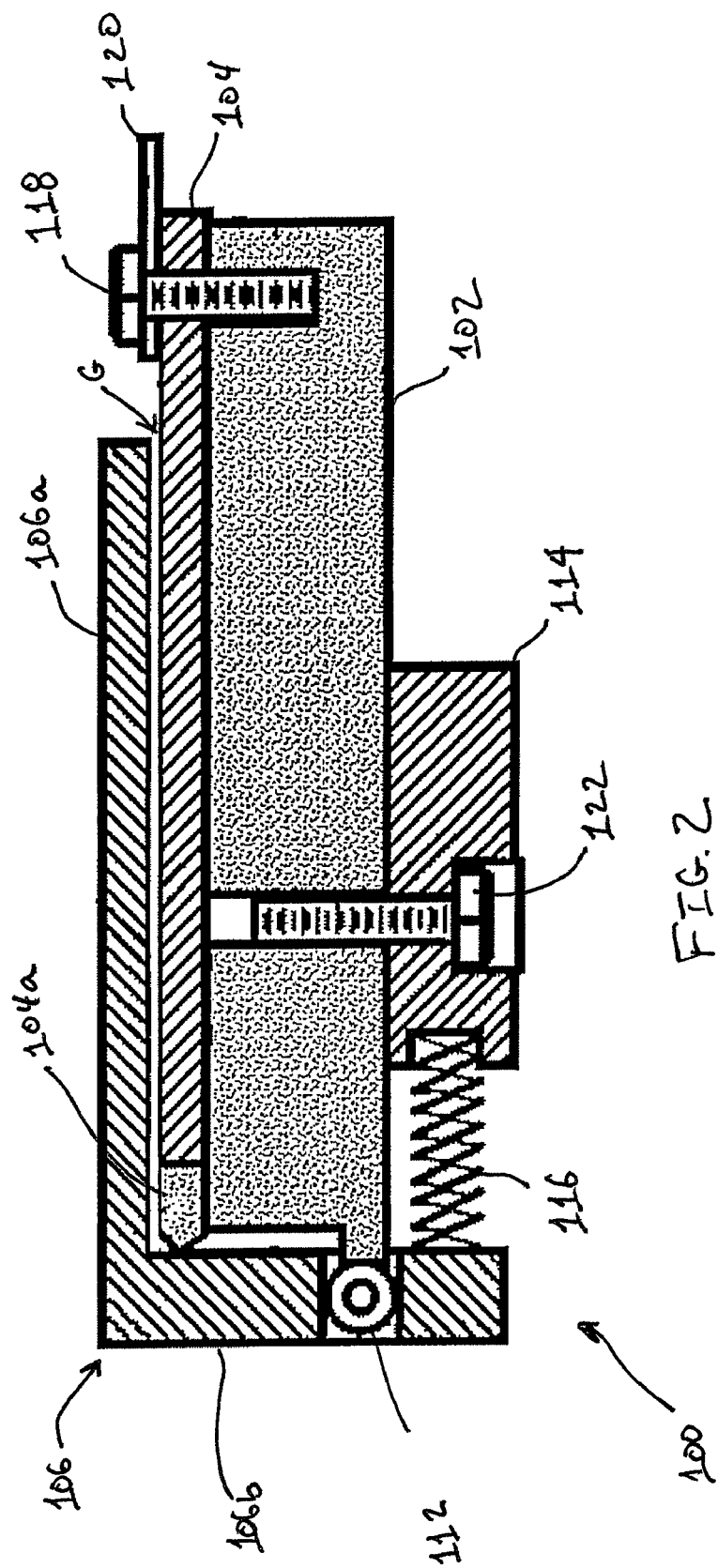
FIG. 2 illustrates a second temperature sensor in accordance with an embodiment.

In an embodiment as shown in FIG. 2, the temperature sensor 100 includes the substrate 102 which is a single piece formed from ceramic or a non-conductive, hard, durable material. In some embodiments, the temperature sensor can be placed in a field container to protect the temperature sensor from contamination, as the temperature sensor 100 may monitor the temperature in a gas filled vessel or a liquid filled vessel.

Figure 3:
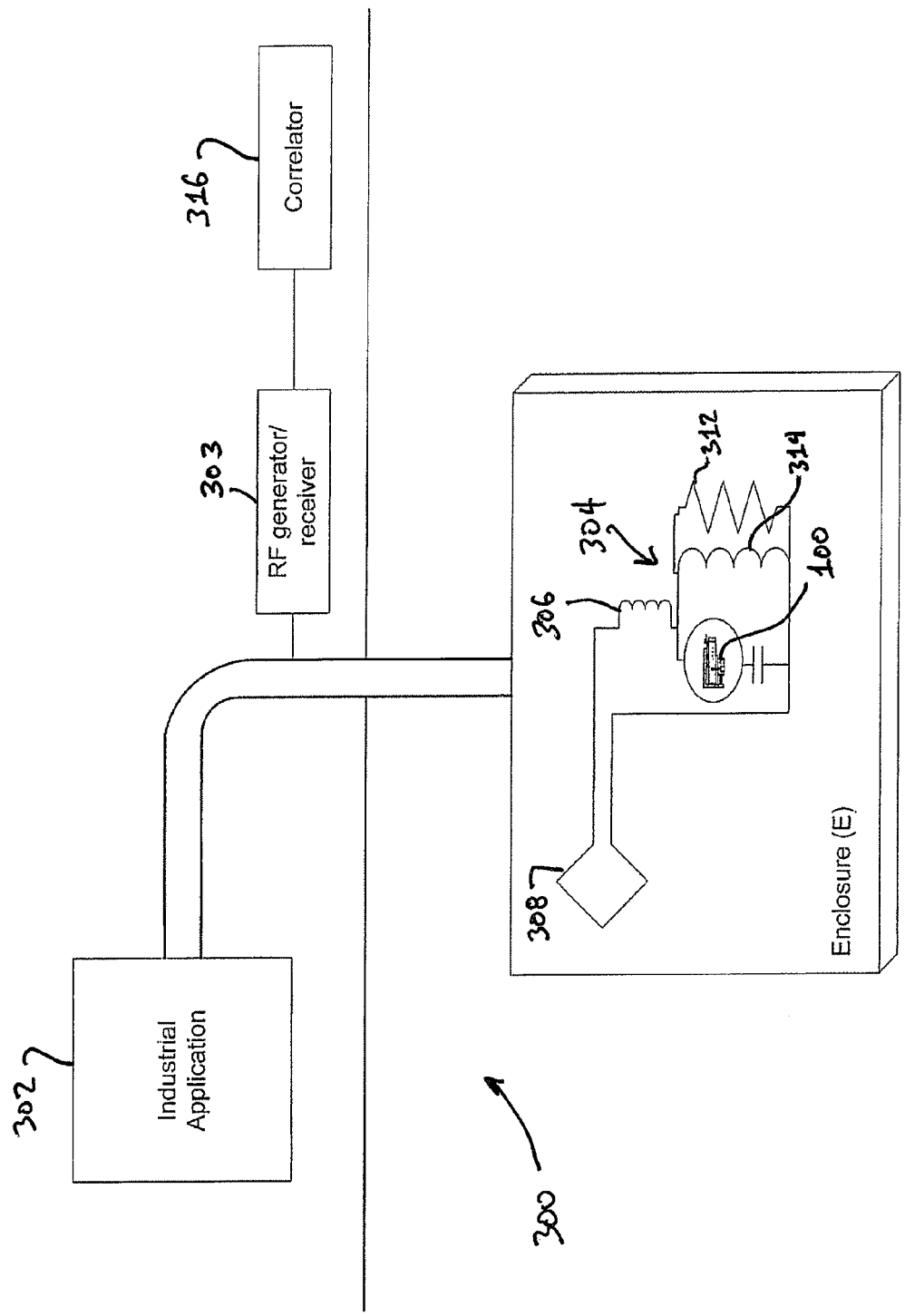
FIG. 3 illustrates a system for measuring the temperature of an enclosure in accordance with an embodiment.

FIG. 3 illustrates a system 300 for measuring temperature in an enclosure (E) of an embodiment.

The enclosure (E) can be implemented in numerous shapes and sizes, for example, and can be implemented as a full or partial enclosure. The enclosure, as illustrated, is a representation of a full enclosure that is located below ground, such as a borehole or well, and contains a liquid or gas at a high temperature. The temperature of the liquid or gas in the enclosure may be measured at temperatures up to 600° F.

The system 300 also includes a high temperature generation unit 302 which may, in operation, generate high temperatures in the enclosure (E). The high temperature generation unit 302 can be represented by numerous industrial applications such as machinery used in drilling operations, manufacturing operations, or construction operations for example. One of ordinary skill in the art will appreciate that the high temperature generation unit 302 can be represented by any heater.

The system 300 includes a signal generator/receiver 303 for generating an electromagnetic signal, such as an RF signal or an electromagnetic pulse (EMP), for example. The electromagnetic signal can be generated in a range of 3 Hz to 30 GHz, or any other range suitable to achieve the desired response or to the environmental conditions.

The system 300 also includes a capacitive sensor 100 for establishing a capacitance based on the generated temperature. As shown in FIG. 1, the capacitive sensor 100 includes a first conductor for generating a mechanical force in response to the temperature generated by the high temperature generation unit 302. The capacitive sensor 100 also includes a second conductor 106 configured to rotate about the first conductor as a result of the force generated by the first conductor 104. The amount of rotation of the second conductor 106 is determined by the force generated by the first conductor 104. The capacitive sensor 100 can be included in a resonant circuit 304, where the change in capacitance of the capacitive sensor 100 shifts the frequency of a signal transmitted by a base station.

The resonant network 304 includes an inductor 306 that connects the resonant network 304 to an antenna 308. The antenna 308 can be any electrical device suitable for receiving or sending a radio frequency (RF) signal or a more generalized electromagnetic signal, e.g., such as cabling, conductive piping, or a coil. The resonant network 304 also includes a network resistance 312 and a network inductance 314. The resonant network 304 receives the RF signal through the antenna 308, and "rings" or resonates at its natural frequency. The capacitive sensor 100 is configured to sense the temperature of the enclosure (E) and modulate the vibration frequency induced in the resonant network 304 when the RF signal is received by the antenna 308. The capacitive sensor 100 modulates the frequency of the RF signal based on the size of the gap (G).

The system 300 also includes a correlator 316 for correlating the modulated frequency to a temperature value. Those of ordinary skill will appreciate that the correlator may be a processor, computer, or other processing device located at a base station. The correlator 316 may perform any desired processing of the modulated signal including, but not limited to, a statistical analysis of the modulated frequency. Commercial products are readily available and known to those skilled in the art can be used to perform any suitable frequency detection. For example, a fast Fourier transform that can be implemented by, for example, MATHCAD available from Mathsoft Engineering & Education, Inc. or other suitable product to deconvolve the modulated ring received from the resonant network 304. The processor can be used in conjunction with a look-up table having a correlation table of modulation frequency-to sensed characteristics (e.g., temperature, pressure, and so forth) conversions.

Figure 4:
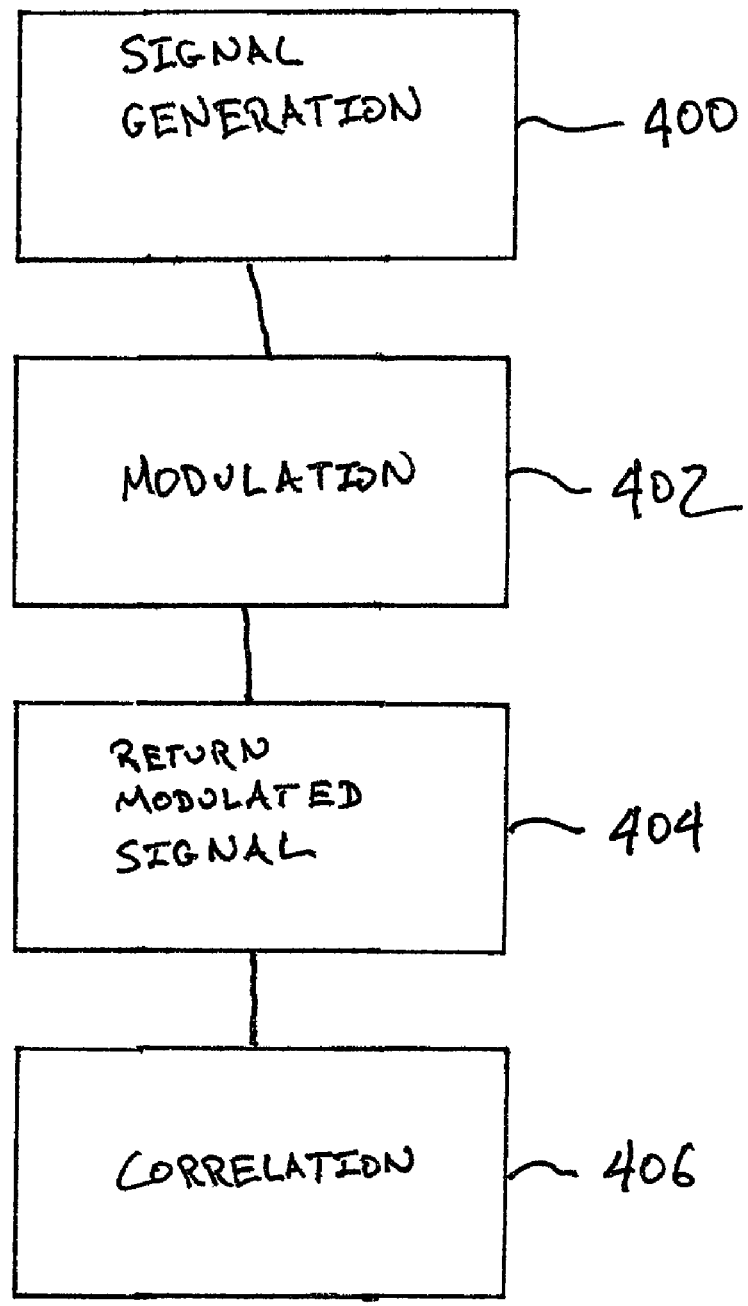
FIG. 4 is a flow chart that illustrates a method of measuring the temperature of an enclosure in accordance with an embodiment.

FIG. 4 is a flowchart illustrating a method of measuring the temperature of an enclosure in an embodiment. The method is executed using the capacitive sensor 100 as described with respect to FIG. 1. As shown in step 400, a predetermined frequency electromagnetic signal, such as an RF signal or electromagnetic pulse, is generated by a base station and transmitted to the resonant network 304 that includes the capacitive sensor 100. The capacitive sensor 100 modulates the received electromagnetic signal based on the temperature of the enclosure (step 402). Specifically, capacitive sensor 100 shifts the frequency due to an adjustment in the size of the gap (G), whereby at least one of the conductor plates of the sensor 100 undergoes a lengthwise expansion, which causes a rotation increase the gap (G) established between the conductor plates.

The resonant network 304 emits a signal having at the shifted (modulated) frequency of the conductor plates about a hinge to the base station (step 404). The base station correlates the shifted frequency to a temperature value so that the observed temperature of the enclosure may be determined (step 406).

While the invention has been described with reference to specific embodiments, this description is merely representative of the invention and is not to be construed as limiting the invention. Various modifications and applications may occur to those skilled in the arts without departing from the true spirit and scope of the invention as defined by the appended claims.

What is claimed is:

1. A system for sensing a temperature in a subterranean environment, comprising:
    a signal generator, configured and arranged generate an electromagnetic signal;
    a sensor probe, locatable in a region of the subterranean environment, the sensor probe including a resonant circuit portion that includes a capacitive element, the resonant circuit portion being configured and arranged to receive energy from the electromagnetic signal and to generate a ringing signal in response to the electromagnetic signal, wherein the capacitive element of the sensor probe is responsive to a temperature condition in the region of the subterranean environment to modulate the ringing signal in accordance therewith;
    the capacitive element comprising:
        a substrate formed of a material having a first coefficient of thermal expansion, wherein the substrate has a first mount portion;
        a first conductive plate formed of a material having a second coefficient of thermal expansion that is higher than the first coefficient of thermal expansion, wherein the first conductive plate is attached to a first surface of the substrate and the first conductive plate has a first contact portion; and
        a second conductive plate having a second mount portion rotatably connected to the first mount portion of the substrate, the second conductive plate being adjacent to the first conductive plate;
        the first and second conductor plates together defining an adjustable gap therebetween, the adjustable gap being adjustable responsive to the temperature condition to alter a capacitance of the capacitive element;

a receiver, configured and arranged to receive the modulated ringing signal; and a processor, configured and arranged to process the modulated ringing signal to obtain a measurement of the condition.

2. A system in accordance with claim 1, wherein the first contact portion of the first conductive plate comprises a fulcrum that is in contact with the second mount portion of the second conductive plate.

3. A system in accordance with claim 1, wherein the first conductive plate has a non-conductive layer on a surface adjacent to the second conductive plate.

4. A system in accordance with claim 1 wherein the substrate further comprises a third mount portion and the third mount portion comprises a mounting plate attached to a second surface of the substrate.

5. A system in accordance with claim 4, further comprising:

a spring, operatively mounted to the mounting plate and to the second mount portion of the second conductive plate such that a biasing spring force is applied to the second conductive plate, counter to a direction of rotation due to changes in sensed temperature.

6. A system in accordance with claim 1, wherein the first contact portion of the first conductive plate has a non-conductive surface.

7. A system in accordance with claim 6, wherein the non-conductive surface of the first contact portion is a non-conductive layer.

8. A system in accordance with claim 1, wherein the substrate comprises:

a first substrate layer and a second substrate layer, wherein the first substrate layer is adjacent to the first conductive plate and the second substrate layer includes the first mount portion.

9. A system in accordance with claim 8, wherein the first substrate layer is an insulating layer and the second substrate layer is a conductive layer.

10. A system in accordance with claim 8, wherein the first substrate layer has a lower coefficient of thermal expansion than the second substrate layer.

11. A system in accordance with claim 10, wherein the first substrate layer has a coefficient of thermal expansion below about $10 \cdot 10^{-6}$ 1/K and the second substrate layer has a coefficient of thermal expansion above about $10 \cdot 10^{-6}$ 1/K.

12. A capacitive sensor comprising:

a substrate formed of a material having a first coefficient of thermal expansion, wherein the substrate has a first mount portion;

a first conductive plate formed of a material having a second coefficient of thermal expansion that is higher than the first coefficient of thermal expansion, wherein the first conductive plate is attached to a first surface of the substrate and the first conductive plate has a first contact portion; and a second conductive plate having a second mount portion rotatably connected to the first mount portion of the substrate, the second conductive plate being adjacent to the first conductive plate, the first and second conductor plates together defining an adjustable gap therebetween, the adjustable gap being adjustable responsive to a temperature condition to alter a capacitance of the capacitive element.

13. A capacitive sensor in accordance with claim 12 wherein the substrate further comprises a third mount portion and the third mount portion comprises a mounting plate attached to a second surface of the substrate.

14. A capacitive sensor in accordance with claim 13, further comprising:

a spring, operatively mounted to the mounting plate and to the second mount portion of the second conductive plate such that a biasing spring force is applied to the second conductive plate, counter to a direction of rotation due to changes in sensed temperature.

15. A capacitive sensor in accordance with claim 12, wherein the substrate comprises:

a first substrate layer and a second substrate layer, wherein the first substrate layer is adjacent to the first conductive plate and the second substrate layer includes the first mount portion, wherein the first substrate layer has a lower coefficient of thermal expansion than the second substrate layer.

16. A capacitive sensor in accordance with claim 15, wherein the first substrate layer has a coefficient of thermal expansion below about $10 \cdot 10^{-6}$ 1/K and the second substrate layer has a coefficient of thermal expansion above about $10 \cdot 10^{-6}$ 1/K.

* * * * *